INVENTOR
A. K. SCHENCK
BY
C. Mathis
ATTORNEY

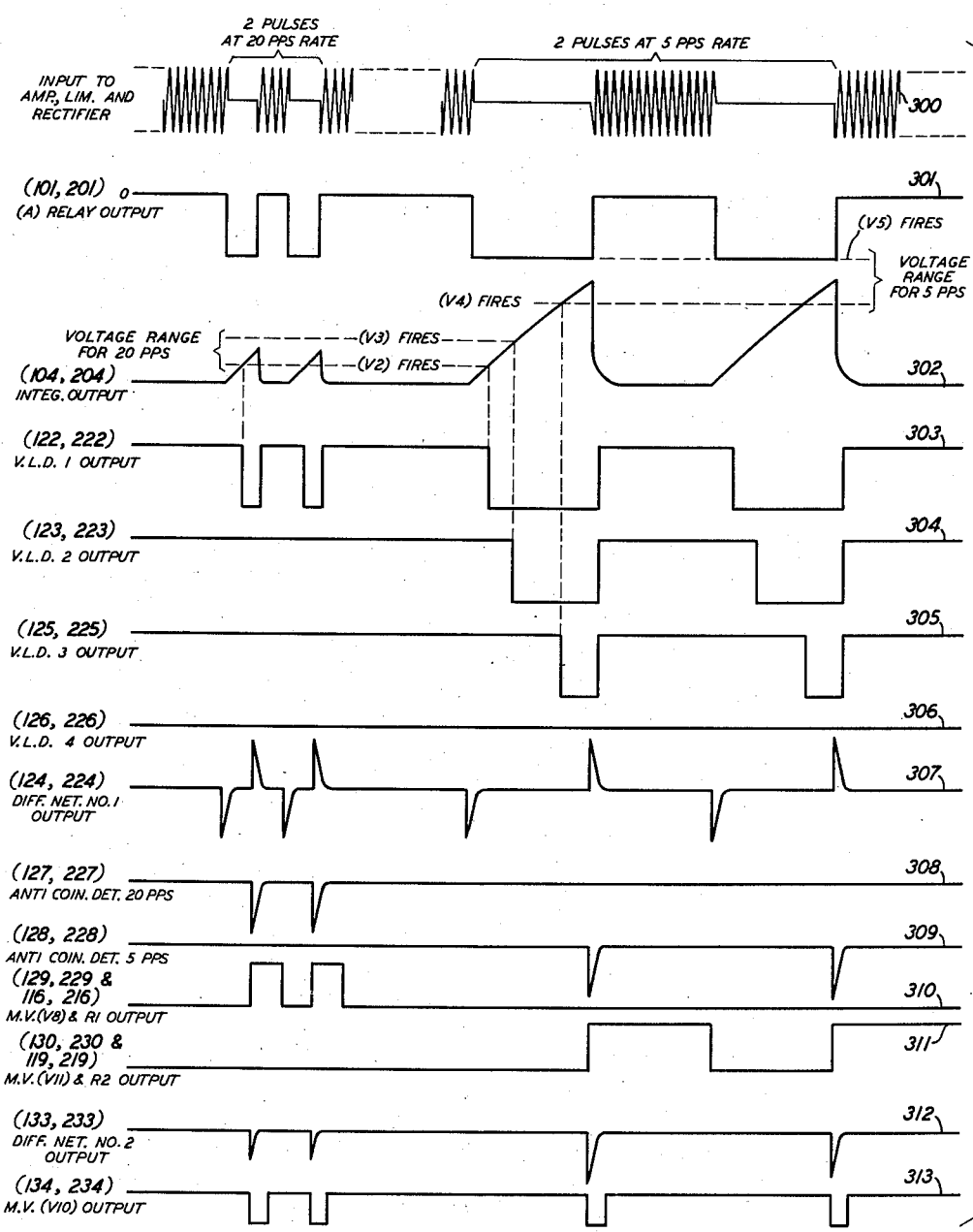

United States Patent Office 2,837,642
Patented June 3, 1958

2,837,642

PULSE RATE DISCRIMINATOR

Alfred K. Schenck, Glen Ridge, N. J., assignor to Bell Telephone Laboratories, Incorporated, New York, N. Y., a corporation of New York Application December 17, 1953, Serial No. 398,738

5 Claims. (Cl. 250—27)

This invention relates to remote control systems and has for its object to exercise selective control by pulsing at different rates.

More specifically the present invention has for its object to provide a pulse rate discriminator which will differentiate between a plurality of rates of pulsing to control different functions.

In accordance with one feature of the invention means is provided for translating each incoming pulse into a voltage magnitude with means for detecting a plurality of voltage levels and operating a particular output in accordance with the voltage level detected.

A further feature of the invention lies in means for arranging the voltage level detectors in pairs and generating an output pulse responsive to the non-coincident operation of any detector pair.

These and other features of the invention will be more clearly understood from a consideration of the following description read in connection with the attached drawings in which:

Fig. 3 shows theoretical wave forms resulting at various points in the operation of the pulse rate discriminator.

The pulse rate discriminator of the present disclosure finds use in such a remote control system as that disclosed and claimed in applicant's copending application Serial No. 398,737, filed December 17, 1953, now Patent No. 2,790,965, dated April 30, 1957.

Figure 1:
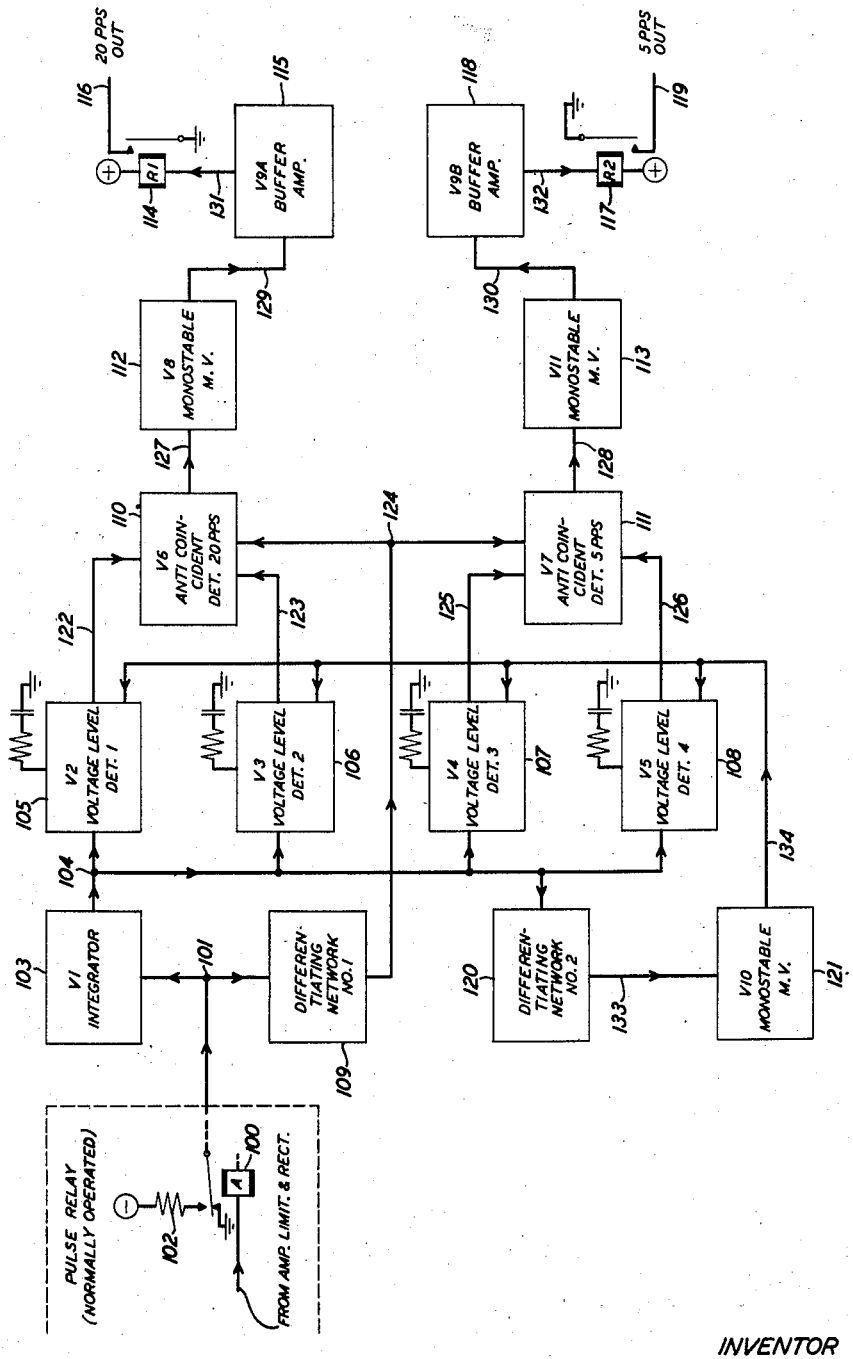
Fig. 1 is a schematic disclosure of the pulse rate discriminator.

Referring first to Fig. 1 for purposes of illustration, the two pulsing rates of five pulses per second and twenty pulses per second have been selected. This pulse rate discriminator is therefor so designed that a single pulse, or a train of pulses, corresponding in pulse length to either of the above-selected rates will be recognized and directed to only their respective receiving points and any interruptions of short or long duration which are outside the limits of these pulse lengths will be ignored and will not render the circuit incapable of further proper operation.

Relay 100 is held normally operated by an alternating-current frequency applied from a control station, which is amplified and rectified to supply the operating circuit for relay 100. When this frequency is interrupted, relay 100 will release for the period of the interruption. Thus incoming pulses (frequency interruptions) are translated to direct-current pulsing at the output of relay 100. Ground is connected to point 101 over the front contact of relay 100 while the frequency is received and a negative voltage through resistance 102 is connected over the back contact of relay 100 to point 101 whenever the frequency is interrupted. Ground on point 100 renders the integrator 103 heavily conducting. When negative battery is connected to point 101, integrator 103 is immediately cut off, permitting its plate voltage to rise at a rate determined by the plate load resistor and an associated capacitor. In this manner, the length of the incoming pulse is translated into a voltage magnitude function at point 104.

The pair of voltage level detectors 105 and 106 are adjusted to recognize respectively a voltage corresponding to the shortest and the longest pulse lengths of a twenty-pulse per second pulse. Detector 105 recognizes that the pulse is not too short in time, while detector 106 recognizes that the pulse is not too long so that a pulse at the twenty-pulse per second rate will cause detector 105 to be activated and detector 106 not to be activated. Similarly, the pair of voltage level detectors 107 and 108 are designed to perform the same functions for the next slower pulse rate, in this case five pulses per second. Thus, on very short interruptions, none of the voltage detectors is activated. On very long interruptions all are activated and for properly timed pulses only the lower numbered one of a pair, detector 105 of the pair 105 and 106 and detector 107 of the pair 107 and 108 will be activated. It will, of course, be understood that additional pulse rates may be discriminated in a similar manner.

Fig. 3 in line 300 shows the voltage variations corresponding to two pulses at each of the two pulse rates and in line 301 indicates the voltage variations in the direct-current output of relay 100 that is at point 101. Line 302 shows the voltage variation at point 104 for the two pulse rates and indicates the relationship of this variation to the voltage range set up by the detector pair 105 and 106 and the detector pair 107 and 108. The voltage at the outputs of the four detectors is shown in lines 303 through 306. It may be observed that adjacent to each of the lines 300 through 313 is indicated the points in Figs. 1 and 2 at which the corresponding voltages appear.

The differentiating network 109 provides a sharp negative pulse from the leading edge of the incoming pulse at point 101 and a sharp positive pulse from the trailing edge (or end) of the same pulse, as shown in line 307 of Fig. 3. The negative pulse is not used. The positive pulse corresponding to the pulse end is then used as an activating pulse to provide a signal if the pulse time has fallen within the proper limits as determined by the voltage level detectors 105 and 106 or 107 and 108. That is, if only the first voltage level detector of a pair is activated when the sharp positive pulse is generated by network 109, a coincident signal is developed indicating that a twenty-pulse per second pulse or a five-pulse per second pulse has been received.

The anticoincident detectors 110 and 111 serve to provide an output only if the above conditions are met. The output from the anticoincident detector 110 or 111 consists of a short negative pulse on conductors 127 or 128, the duration of this pulse being a function of the duration of the pulse from the differentiating network 109. These negative pulses are illustrated at lines 308 and 309 of Fig. 3.

The pulse from detector 110 or detector 111 is used to trigger a monostable multivibrator (flip-flop circuit) 112 or 113, which effectively stretches the incoming sharp negative pulse to approximately the equivalent of a twenty-pulse per second or a five-pulse per second pulse respectively. These multivibrators are arranged to "flip" upon receipt of a narrow negative pulse and "flop" back again in a predetermined time to assume their original stable state. The outputs of the multivibrators 112 and 113 are illustrated in lines 310 and 311 of Fig. 3.

The output of the multivibrator 112 is connected over conductors 129 and 131 to the winding of relay 114 through buffer amplifier 115. Relay 114 reproduces the timing of multivibrator 112 and provides a ground output on conductor 116 at a twenty-pulse per second rate, whenever pulses are received at point 101 within the specified time limits for this pulse rate. Similarly, the output of multivibrator 113 is connected over conductors 130 and 132 to relay 117 through buffer amplifier 118, and relay 117 provides pulses at the five-pulse per second rate to conductor 119.

Differentiating network 120 produces a sharp negative pulse at the end of each incoming pulse, as indicated in line 312 of Fig. 3. This sharp negative pulse in turn activates the monostable multivibrator 121. This multivibrator is arranged to "flop" for a short duration, sufficiently long to lower the plate voltage to all the voltage level detectors 105 to 108 to permit them to restore to their normal state in anticipation of receiving and detecting succeeding pulses. The output of multivibrator 121 is shown in line 313 of Fig. 3. Since the pulse from differentiating network 120 coincides in time with the actuating pulse from differentiating network 109, a resistance-capacity timing circuit is connected to each voltage level detector to insure that these detectors do not become deactivated before the respective anticoincident detectors have functioned and operated the associated monostable multivibrators.

DETAILED OPERATION

Figure 2:
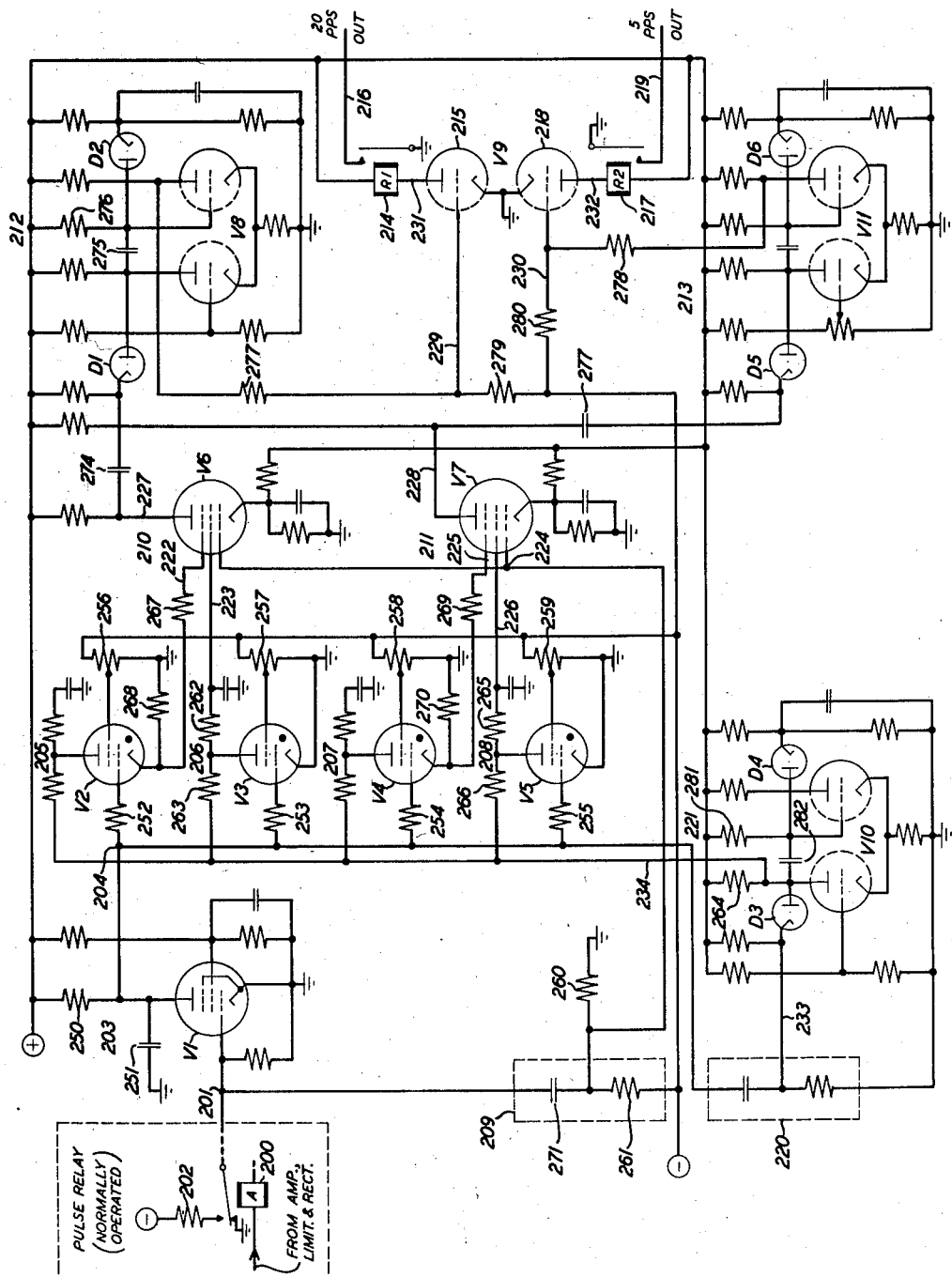
Fig. 2 is a detailed disclosure of the pulse rate discriminator.

Referring now to Fig. 2, the various elements of Fig. 2 have been given corresponding numbers to those used in Fig. 1 but in the 200 series.

Integrator stage

This stage consists of a sharp cut-off pentode V1 which is normally heavily conducting by virtue of the zero grid-to-cathode voltage due to ground applied to the grid over the front contact of the pulsing relay 200. Under this condition the voltage at the plate of tube V1 will be quite low being in the vicinity of +6 volts to +10 volts where the plate supply is +250 volts to +300 volts. When the pulsing relay 200 releases, applying negative voltage to point 201 and the grid of tube V1, tube V1 is immediately cut off, thus permitting its plate voltage to start rising at an exponential rate towards the plate supply voltage. The rate of rise however is controlled by the combination of resistance 250 and capacitor 251 so that the voltage on point 204 rises in the manner illustrated at line 302 of Fig. 3. Although other resistors and condensers are connected to point 204 and contribute to the control of the voltage rise they will be ignored at this time. In this manner the integrator stage 203 provides a translation from pulse length to voltage amplitude. Fast recovery at the end of a pulse is achieved by the connection of ground to the grid of tube V1 which again enables tube V1. The conducting tube plate resistance is now in parallel with the effective plate load resistance thus providing for rapid discharge of capacitor 251.

Voltage level detectors

The output from the integrator stage 203 is connected to point 204 and through high resistances 252, 253, 254 and 255 to the control grids of voltage level detector tubes V2, V3, V4 and V5, respectively. These detecting stages consist of hot cathode gas-filled tetrodes. These tubes are adjusted to fire at a predetermined positive voltage on their control grids by adjusting the negative bias connected to the auxiliary grid by means of potentiometers 256, 257, 258 and 259, respectively.

Tube V2 is adjusted to fire when the potential on its control grid represents the shortest acceptable pulse length and tube V3 is adjusted to not fire at a control grid voltage corresponding to the longest acceptable pulse length of the highest pulsing speed to be accepted, but it does fire in response to a pulse length just slightly greater than the longest pulse length of the highest pulsing speed to be accepted, twenty pulses per second in this instance.

Tubes V4 and V5 are adjusted to fire in the same relationship to the next lower pulsing speed (five pulses per second), that is, tube V4 will fire for any pulse length equal to or greater than the minimum pulse length for a five-pulse per second rate and tube V5 will not fire if the pulse length falls within the limits set for the maximum pulse length to be acepted.

None of the above stages will fire for a very short pulse and all stages will fire for a long pulse. Once fired these stages remain conducting until extinguished by an action following the pulse end as will be described hereinafter.

Anticoincident detectors

The anticoincident detector stages 210 and 211 consist of pentagrid control tubes V6 and V7 which are normally non-conducting, being under control of the positive bias applied to each cathode which produces a negative grid-to-cathode condition. In each tube the lowermost or control No. 1 grid is connected to a negative potential supplied by the voltage divider comprising resistances 260 and 261 connected between ground and negative battery. The center or screen grid of tube V6 is at a high positive potential supplied through resistances 262, 263 and 264. The center grid of tube V7 is also at a high positive potential supplied through resistances 265, 266 and 264. The upper or control No. 2 grid of tube V6 is at ground potential supplied through resistances 267 and 268 while the upper grid of tube V7 is also at ground potential supplied through resistances 269 and 270. Conduction in tube V6 can only occur if tube V2 is fired, tube V3 is not fired and a positive polarity pulse is received at its lower grid. This means that if both tube V2 and tube V3 are fired conduction cannot occur, or that if neither tube V2 nor tube V3 are fired conduction cannot occur, hence the name "anticoincident circuit." This action results from the requirement that a positive voltage derived from the cathode of tube V2 when fired must be present at the upper grid and that a high positive voltage from the plate of non-fired tube V3 must be present at the center grid at the time that a positive pulse is received on the lower grid. The differentiating network 209 consisting of resistance 261 and capacitor 271, which is connected to point 201 at the output of relay 200, will generate a sharp negative pulse at the beginning of each incoming pulse and a sharp positive pulse at the end of each incoming pulse. The negative pulse is unused but the positive pulse signifying that the incoming pulse is ended will render tube V6 conducting during the period of this sharp positive pulse if the above conditions are met on the upper and middle grids. If these conditions do not exist on the upper or middle grids there will be no output from tube V6.

Tube V7 functions in an identical manner under the control of tubes V4 and V5 and the same sharp positive pulse connected to its lower grid.

In this manner tube V6 will provide a sharp negative pulse on conductor 227 or tube V7 will provide a sharp negative pulse on conductor 228 if an incoming pulse corresponding to a twenty-pulse per second or a five-pulse per second pulse, respectively, is received.

Monostable multivibrators

Multivibrators 212 and 213 consist of twin triodes and are conventional cathode-coupled flip-flop circuits in which the right half is normally conducting and the left half is normally cut off. The sharp negative pulse on conductor 227 transmitted through capacitor 274 and diode D1 causes the right side of multivibrator V8 to be cut off and the left side to become conducting. This condition remains until a time determined by capacitor 275 and resistor 276, when the circuit restores to the normal or stable condition.

In this manner, upon receipt of a narrow negative pulse, a pulse of suitable duration is generated for further circuit usage representing receipt and regeneration of a twenty-pulse per second rate pulse.

Multivibrator 213 functions in an identical manner to that of multivibrator 212 and regenerates a five-pulse per second rate pulse when a triggering pulse is received through capacitor 277 from tube V7. The diodes D1, D2, D5 and D6 are used for polarity and voltage amplitude isolation and provide some clamping action for stabilization of their respective multivibrators.

Buffer amplifiers

The buffer amplifiers consist of tubes 215 and 218 which may or may not be included in a common envelope. The grid of tube 215 is connected over conductor 229, through resistor 277 to the plate of the right half of multivibrator V8 while the grid of tube 218 is connected over conductor 230 and through resistance 278 to the plate of the right half of multivibrator V11. These amplifiers provide isolation and power amplification for the output of the multivibrators and operate the plate circuit relays 214 and 217 for each cycle or "flip" of the respective multivibrator. That is, when multivibrator V8 is triggered to cut off the right half and cause the left half to conduct, the consequent raising of the plate voltage of the right half causes the grid of tube 215 to become sufficiently less negative to permit plate conduction and consequent operation of relay 214. Tubes 215 and 218 are normally cut off by virtue of the negative bias connected through resistances 279 and 280. The operation of relay 214 or 217 provides a ground pulse at a twenty-pulse per second or a five-pulse per second rate and pulse width on conductors 216 and 219, respectively. These two conductors represent the output of the pulse rate discriminator.

Auxiliary monostable multivibrator

The multivibrator 221 consists of a conventional monostable multivibrator similar to multivibrators 212 and 213 and functions in an identical manner to provide for removing plate voltage from the voltage level detectors 205 to 208. This plate voltage is removed at the end of each pulse to permit deionization of any fired voltage level detector.

The output of integrator 203 is differentiated through the differentiating network 220 to provide a sharp negative pulse at the end of each incoming pulse as shown in line 312 of Fig. 3. Multivibrator V10 is triggered by this negative pulse and "flips" to its quasi stable state for a period of time sufficiently long to permit all of the voltage level detectors 205 to 208 to deionize. This timing is determined by the combination of resistor 281 and capacitor 282. At the end of this timed interval multivibrator V10 returns to its stable state, thus restoring the plate voltage supplied to the detectors to the normal operating value. This plate voltage supply is fed through resistor 264 of the multivibrator V10 and is the full circuit plate supply voltage during the stable condition of multivibrator V10, being reduced somewhat as each detector fires, but remaining sufficiently high to permit satisfactory operation of each successive detector and multivibrator V10. As each detector fires, this plate supply voltage to the successive detector will be lowered. However, since these latter stages will always fire successively, the original calibration of the circuit, involving the adjustment of potentiometers 256, 257 258 and 259, will automatically compensate for this change. Multivibrator V10 is designed to trigger with all, some or none of the voltage level detectors fired.

If it is desired to eliminate this interdependence of multivibrator V10 with the fired detectors, a separate restoring multivibrator may be supplied for each detector or multivibrator V10 may operate a relay in the manner of multivibrators V8 and V11. Individual contacts on such a relay would then open each detector plate supply voltage lead for a timed interval to permit deionization.

What is claimed is:

1. In an electrical circuit for receiving trains of pulses of a plurality of predetermined durations, the pulses of any one train having substantially equal duration, means for generating a voltage pulse varying in accordance with the duration of each received pulse, a pair of detectors, an anticoincidence circuit, a multivibrator and an output circuit individual to each predetermined duration, one detector of each pair adjusted to detect a minimum pulse of that duration, the other detector of each pair adjusted to detect a more than maximum pulse of that duration, each anti-coincidence circuit responsive to the non-coincident operation of the associated pair of detectors, each multivibrator adjusted to develop an output pulse of the duration to which it is individual, means for directing the voltage pulse resulting from an incoming pulse to all of said detectors, means for marking the termination of said received pulse, and means under the control of said marking means for causing the responsive anticoincidence circuit to operate the individual multivibrator to transmit a pulse of the individual duration to the individual output circuit.

2. In an electrical circuit for receiving trains of pulses of a plurality of predetermined durations, the pulses of any one train having substantially equal duration, means for generating a voltage pulse varying in accordance with the duration of each received pulse, a pair of detectors, an anticoincidence circuit, a multivibrator and an output circuit individual to each predetermined duration, one detector of each pair adjusted to detect a minimum pulse of that duration, the other detector of each pair adjusted to detect a more than maximum pulse of that duration, each anticoincidence circuit responsive to the non-coincident operation of the associated pair of detectors, each multivibrator adjusted to develop an output pulse of the duration to which it is individual, means for directing the voltage pulse resulting from an incoming pulse to all of said detectors, means for marking the termination of said received pulse, means under the control of said marking means for causing the responsive anticoincidence circuit to operate the individual multivibrator to transmit a pulse of the individual duration to the individual output circuit, other means for marking the termination of said received pulse, and means under the control of said other marking means to restore all operated detectors to normal.

3. In an electrical circuit for receiving trains of pulses of a plurality of predetermined durations, the pulses of any one train having substantially equal duration, means for generating a voltage pulse varying in accordance with the duration of each received pulse, a pair of detectors, an anticoincidence circuit, a multivibrator and an output circuit individual to each predetermined duration, one detector of each pair adjusted to detect a minimum pulse of that duration, the other detector of each pair adjusted to detect a more than maximum pulse of that duration, each anticoincidence circuit responsive to the non-coincident operation of the associated pair of detectors, each multivibrator adjusted to develop an output pulse of the duration to which it is individual, means for directing the voltage pulse resulting from an incoming pulse to all of said detectors, means responsive to the termination of said received pulse to transmit a positive pulse to all of said anticoincidence circuits, means under the control of said positive pulse for causing the responsive anticoincidence circuit to operate the individual multivibrator to transmit a pulse of the individual duration to the individual output circuit, and other means responsive to the termination of said received pulse to transmit a negative pulse to all of said detectors to restore all operated detectors to normal.

4. In an electrical circuit for receiving trains of pulses of a plurality of predetermined durations, the pulses of any one train having substantially equal duration, means for generating a voltage pulse varying in accordance with the duration of each received pulse, a pair of detectors, an anticoincidence circuit, a multivibrator and an output circuit individual to each predetermined duration, one detector of each pair adjusted to detect a minimum pulse of that duration, the other detector of each pair adjusted to detect a more than maximum pulse of that duration, each anticoincidence circuit responsive to the non-coincident operation of the associated pair of detectors, each multivibrator adjusted to develop an output pulse of the duration to which it is individual, means for directing the voltage pulse resulting from an incoming pulse to all of said detectors, means for marking the termination of said received pulse, means under the control of said marking means for causing the responsive anticoincidence circuit to operate the individual multivibrator to transmit a pulse of the individual duration to the individual output circuit, other means for marking the termination of said received pulse, means under the control of said other marking means to restore all operated detectors to normal, and means in each detector for delaying the restoration of the detector for an interval following the operation of said other marking means.

5. In an electrical circuit for receiving trains of pulses of a plurality of predetermined durations, the pulses of any one train having substantially equal duration, means for generating a voltage pulse varying in accordance with the duration of each received pulse, a pair of detectors, an anticoincidence circuit, a multivibrator and an output circuit individual to each predetermined duration, one detector of each pair adjusted to detect a minimum pulse of that duration, the other detector of each pair adjusted to detect a more than maximum pulse of that duration, each anticoincidence circuit responsive to the non-coincident operation of the associated pair of detectors, each multivibrator adjusted to develop an output pulse of the duration to which it is individual, means for directing the voltage pulse resulting from an incoming pulse to all of said detectors, means responsive to the termination of said received pulse to transmit a positive pulse to all of said anticoincidence circuits, means under the control of said positive pulse for causing the responsive anticoincidence circuit to operate the individual multivibrator to transmit a pulse of the individual duration to the individual output circuit, other means responsive to the termination of said received pulse to transmit a negative pulse to all of said detectors to restore all operated detectors to normal, and means in each detector for delaying the restoration of the detector for an interval following the transmission of said negative pulse.

References Cited in the file of this patent

UNITED STATES PATENTS

| | | |
|---|---|---|
| 2,359,447 | Seeley | Oct. 3, 1944 |
| 2,529,666 | Sands | Nov. 14, 1950 |
| 2,553,284 | Sunstein | May 15, 1951 |
| 2,564,014 | Lanuza | Aug. 14, 1951 |
| 2,636,983 | Poole | Apr. 28, 1953 |
| 2,716,217 | Katz | Aug. 23, 1955 |